United States Patent [19]  
Fried

[11] Patent Number: 4,698,493  
[45] Date of Patent: Oct. 6, 1987

[54] METHOD AND APPARATUS FOR MEASURING DISTANCE UTILIZING BINOCULAR OPTICS

[75] Inventor: David L. Fried, Placentia, Calif.

[73] Assignee: D. L. Fried Associates, Inc., Placentia, Calif.

[21] Appl. No.: 767,485

[22] Filed: Aug. 20, 1985

[51] Int. Cl.$^4$ ............................................. G01J 1/36
[52] U.S. Cl. .................................. 250/204; 250/201; 356/4
[58] Field of Search ............. 250/201 PF, 201 R, 204, 250/578, 209; 354/406, 407, 408, 404; 356/373, 375, 4

[56] References Cited
U.S. PATENT DOCUMENTS 3,765,765 10/1973 Hefter ................................. 250/201
3,906,219 9/1975 Stauffer ............................... 354/404

Primary Examiner—Edward P. Westin
Assistant Examiner—Jessica L. Ruoff
Attorney, Agent, or Firm—Harvey C. Nienow

[57] ABSTRACT

An optical distance measuring system which utilizes binocular optics with a mosaic sensor to simulate stereo imaging so that distance can be determined by noting the apparent displacement between left and right images in the stereo pair. The binocular optics comprise spaced shutter mechanisms which are alternatively actuated, the first such image information on the sensor being stored for ultimate comparison with information from the sensor as obtained through the other shutter mechanism, such compared information enabling distance or depth to be determined through the use of appropriate mathematical equations.

5 Claims, 3 Drawing Figures

METHOD AND APPARATUS FOR MEASURING DISTANCE UTILIZING BINOCULAR OPTICS

The present invention relates generally to optical distance measuring systems and to a method of measuring distance, but more particularly to such systems and method which utilize binocular optics for comparing views through spaced shutter mechanisms.

BACKGROUND OF THE INVENTION

In this day of sophisticated automation, there are myriad conditions which require a determination of distance between two predetermined points. Most often, it is impossible or impractical to use normal measuring devices for such purposes. Frequently, as in making measurements in space, it is impossible to make a physical measurement due to the environment. Also, it is frequently necessary that such distance measurements be determined virtually instantaneously to enable other processes or determinations to go forward within certain time parameters.

One particular example of the need for accurate and fast distance measurements is with respect to robots which perform various physical movements. For instance, a robot might be assigned the task of picking up an object at point A and placing it in a precise position at point B. Needless to say, it would be highly beneficial, if not mandatory, for the robot mechanism to know extremely accurately what the distance is from point A to point B, even though there might be some additional sensors which would be responsive to contact between portions of the mechanisms at one or more locations. Thus, if such a robotic mechanism could include means for optically viewing a scene and thereafter determining for itself the distance from point A to point B, it could then be programmed to move that precise distance.

OBJECTS OF THE INVENTION

In view of the foregoing, it is an object of the present invention to provide an optical distance measuring system which would operate virtually automatically in determining the distance to a given object.

It is another object of the present invention to provide an optical distance measuring system as characterized above which employs binocular optics with first one side and then the other side viewing a given scene, and displacement between such views being translated into distance or depth.

Another object of the present invention is to provide an optical distance measuring system as characterized above which can employ substantially any type of optical system for transmitting several spaced views of a given scene to a mosaic sensor.

Another object of the present invention is to provide an optical distance measuring system as characterized above wherein detector elements of substantially any design may be used to develop the measurement of distance or depth, the only requirement being that such elements be sensitive to the viewing of the particular scene or field of view.

A still further object of the present invention is to provide an optical distance measuring system as characterized above wherein spaced shutter mechanisms of substantially any design are employed such that first one and then the other of such shutter mechanisms can be operated to provide spaced views of a given scene, and any displacement of objects noted and used to calculate distance or depth.

A still further object of the present invention is to provide an optical distance measuring system as characterized above wherein means is included for insuring precise correspondence or registration of one to another of the views or exposures through the respective shutter mechanisms.

Another still further object of the present invention is to provide optical distance measuring systems as characterized above which are workable with present-day computer mechanisms such that distance readings can be provided virtually instantaneously, as well as substantially continuously throughout a given period of time.

Another object of the present invention is to teach a method of measuring distance or depth wherein unique binocular optics is employed, including a pair of spaced shutter mechanisms of virtually any type or design.

Another even still further object of the present invention is to teach the method of making distance measurements as characterized above wherein first one and then the other of the spaced shutter mechanisms are caused to view a given scene, and wherein such views or exposures are caused to be compared precisely so as to provide precise indication of any displacement of objects from one view to the other.

A still further object of the present invention is to provide optical distance measuring means as characterized above, and a unique method of measuring distance or depth, both of which are practical and feasible within today's technology.

BRIEF DESCRIPTION OF THE DRAWINGS

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

Like reference characters indicte corresponding parts throughout the several views of the drawings.

DESCRIPTION OF THE PREFERRED EMBODIMENT

Figure 2:
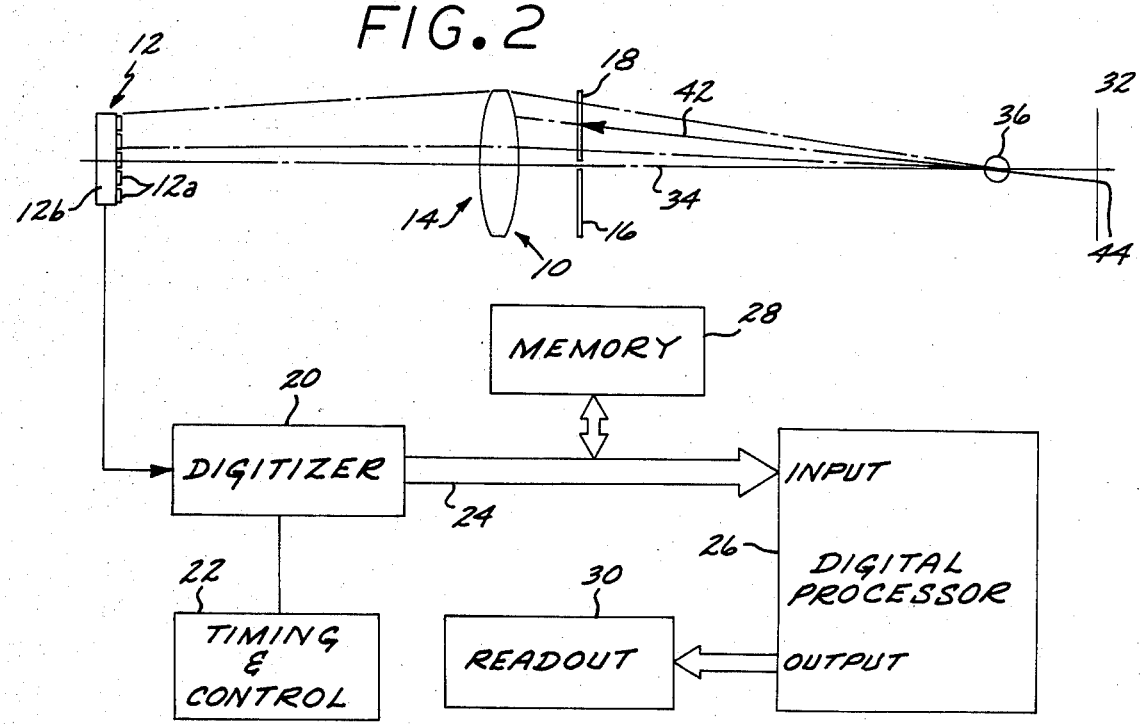
FIG. 2 is a schematic view similar to FIG. 1, and showing a second step in the method of distance determination.

Referring to FIG. 2 of the drawings, it is seen that the present invention is an optical distance measuring system 10 comprising a mosaic array or sensor 12, and an optical system 14. The array or sensor 12 may be of substantially any preferred design but is intended herein to be a two-dimensional co-planar structure of a multiplicity of detector elements 12a mounted on a platform or base 12b. Such individual detector elements may be infrared sensitive so as to provide an electrical potential corresponding to the level of infrared sensed by it. Alternately, they may be visibly sensitive so as to provide an electrical potential corresponding to the level of visible radiation sensed by it.

The optical system 14 may take substantially any desired form consistent with the principles hereinafter described with respect to the instant invention. The single lens shown in the drawings is merely representative of a general optical system, whereas the system selected might be considerably more complicated, having many individual and interrelated lenses.

Mounted in front of the optical or lens system 14 is a pair of spaced shutter mechanisms 16 and 18. Such mechanisms may be mechanical in nature or they may be liquid crystal devices or other electro-optic devices, the only requirement being that the several shutter mechanisms be spaced from each other, laterally of the general line of sight from the detector array to the field of view. Each shutter mechanism 16 and 18 must be individually operable so as to expose the detector array 12 to the field of view at different times.

In circuit with the detector array 12 is a digitizer 20 for converting analog signals from the detector array into digital information for subsequent processing. Associated with the digitizer 20 are the appropriate timing and control means 22. A buss 24 carries the signals from the digitizer to the input of a digital processor 26, there being a memory or storage device 28 for receiving information from the digitizer 20 for subsequent use in the digital processor. The output of digital processor 26 is fed to a readout device 30 which, in accordance with signals received from such processor, is capable of displaying distance information, as will hereinafter be explained in greater detail.

Also shown in FIG. 2 of the drawings, there is a field of view 32 being viewed along the line of sight 34 by the optical system 14 and detector array 12. The subject optical system requires the field of view to be irregular such that there are background objects and at least one foreground object. Representing that condition is the object 36 spaced from and in front of the background in the field of view 32, as shown in the drawings. This, of course, is merely a representation of the fact that substantially any sighting or scene would have certain foreground objects which are closer to the lens system 14 and background objects which are farther away.

Figure 1:
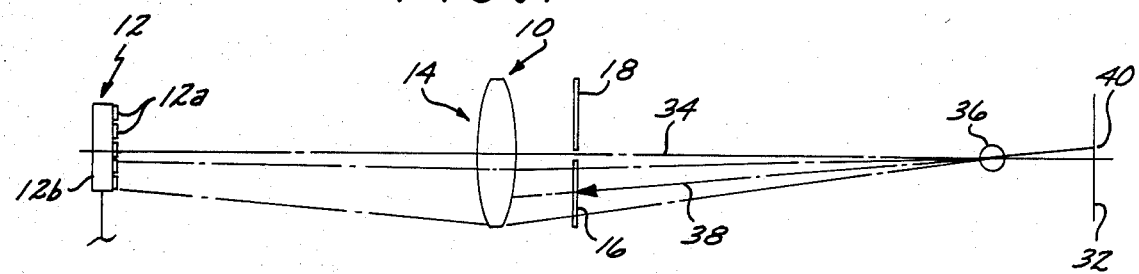
FIG. 1 is a schematic showing of an optical system according to the present invention, and a first step in the method of distance determination.

Referring now to FIG. 1 of the drawings, it is seen that initially one of the shutter mechanisms, in this case shutter mechanism 16, is opened so as to expose the detector array 12 to the field of view through an aperture in shutter mechanism 16. This is indicated by the broken line 38 which shows that the foreground object 36 is seen by the detector array 12 as being located at the point 40 in the background of the field of view 32. Such view passes through the aperture in shutter mechanism 16 as well as the lens system 14 to the individual detector element 12a of the array 12 to thereby create corresponding electrical signals in the latter. Referring to FIG. 2 of the drawings, this information is conducted to the digitizer 20 where it is converted to digital signals and is then passed to and stored within the memory 28.

Thereafter, as shown in FIG. 2 of the drawings, the shutter mechanism 16 is closed and shutter mechanism 18 is opened, exposing the detector array 12 to the same field of view 32, but this time along the broken line 42. Such sighting along line 42 causes the object 36 to appear on the detector array in front of the point 44 of the background in the field of view 32. As will be well understood by those persons skilled in the art, this causes a different energy distribution across the face of the mosaic array 12. The various energizations of the detector elements 12a are then conducted to the digitizer and, together with the previously stored information from the conditions of FIG. 1 of the drawings, is passed to the digital processor 26.

At this point in the process, the digital processor 26 has received information from both the first and second exposures, and is assigned the task of determining range data. This is accomplished by identifying a pixel which (or rather a set of pixels each of which) is at the center of a region of interest in the field-of-view. Such a pixel would be at the center of the region encompassing the foreground object 36. It is possible to identify all of the pixels in the field-of-view as centers of regions of interest. For each thus identified region, a range is calculated utilizing the stored data in the equation described below.

First, a displacement, $\delta$, is calculated for the region according to the equation $$\delta = \alpha \frac{\Delta}{4} \frac{\Sigma_{i,j}[(m_{i,j} - m'_{i+1,j})^2 - (m_{i+1,j} - m'_{i,j})^2]}{\Sigma_{i,j}(m_{i,j} - m_{i+1,j})^2}$$

where $\alpha$ is a constant whose value is to be adjusted experimentally, but whose value is very nearly equal to unity. $\Delta$ is the center-to-center spacing of pixels. $M_{i,j}$ denotes the measured signal value for the $(i,j)^{TH}$ pixel on the most recent frame, i.e., the frame with shutter 18 open and $M'_{i,j}$ is the measured signal value for the $(i,j)^{TH}$ pixel on the previous frame, i.e., the frame with shutter 16 open. All of these values are stored in memory. The sum over i,j includes all of the pixels in the region of interest.

Second, once the value of $\delta$ has been determined, the range, R, to the region of interest is determined according to the equation $$R = R_0 \pm \delta R_0^2/(FS),$$

where the plus or minus sign is chosen according to the sense of the image displacement. The quantity $R_0$ denotes the range for which an object in the field-of-view is exactly focused by the optics 14 onto the mosaic array 12. The quantity F denotes the distance from the optics 14 to the mosaic array 12. The quantity S denotes the center-to-center separation of the two shuttered regions behind the two shutters 16 and 18. This separation is measured in the region in front of the optics, so for FIG. 3 it would correspond to the distance between optics rays 60 and 62.

By solving these equations the quantity R is determined and is passed to the readout device 30 through the output of processor 26. The readout then displays the precise distance from the lens system 14 to the object 36 and to any other region of interest in the field-of-view. The several mathematical equations set forth herein can be solved either manually or with equipment especially constructed for that purpose. Since modern-day equipment is able to perform such calculations in a direct and speedy manner, it is desirable to use such equipment, particularly if many distance measurements must be taken within a short period of time.

It is well understood that the output of processor 26 could be used to actuate other instrumentalities as, for instance, a motor or other electromotive means for directly moving a robot arm or the like. That is, the signal from the digital processor could be used to energize other apparatus for performing functions which are dependent upon the distance between object 36 and the lens system 14.

If desired, the subject measuring system can be further modified by causing the shutter mechanisms 16 and 18 to be effectively spaced apart an even greater distance. That is, by the use of the binocular arrangement depicted in FIGS. 1 and 2, and by alternately using one and then the other of such mechanisms, a given accuracy results. By increasing the spacing between such shutter mechanisms, or by effectively increasing such spacing, as shown in the embodiment of FIG. 3 of the drawings, the accuracy of the resulting distance measurements is enhanced.

Figure 3:
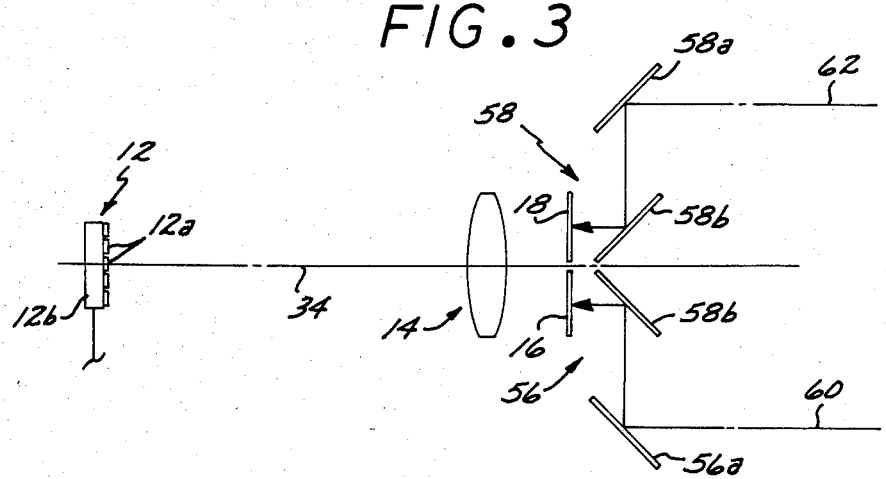
FIG. 3 is a schematic showing of a second embodiment of the present invention.

In FIG. 3, there is shown periscopic mechanisms 56 and 58, associated respectively with shutter mechanisms 16 and 18. With the latter arrangement, the field of view for shutter mechanism 16 is reflected from mirrors 56a and 56b, while the field of view for mechanism 18 is reflected from mirrors 58a and 58b. Thus, as shown in FIG. 3 by the broken lines 60 and 62, the detector array 12 is exposed to the field of view along widely spaced lines of sight.

It is thus seen that the present invention provides a system for accurately determining the distance or depth to a given object. If modern day high speed equipment is employed, it is seen that distance or depth measurement of this kind can be performed at a high rate of speed such that many readings can be taken per second to constantly monitor changes which take place in the distance or depth to a given object.

Although I have shown and described certain specific embodiments of my invention, I am well aware that many modifications thereof are possible. The invention, therefore, is not to be restricted except insofar as is necessitated by the prior art and by the spirit of the appended claims.

I claim:

1. An optical distance measuring system comprising in combination,
    a detector array having a multiplicity of detector elements in a single plane directed along a line of sight for a given field of view, each of said elements providing an electrical signal corresponding to information at a predetermined separate location in the field of view,
    an optical system interposed between said array and said field of view including a pair of shutter mechanisms spaced from each other laterally of said line of sight for alternately exposing said array to said field through spaced apertures in said mechanisms respectively,
    means for comparing the signals from said array from said alternate exposures to determine the displacement from one exposure to the other of predetermined signals as a measure of distance including means for insuring registration of said alternate exposures to accurately determine the displacement of a foreground object with respect to background objects from one to another of said exposures and for providing an indication of any misregistration $\delta$ developed from the equation $$\delta = \alpha \frac{\Delta}{4} \frac{\Sigma_{i,j}[(m_{i,j} - m'_{i+1,j})^2 - (m_{i+1,j} - m'_{i,j})^2]}{\Sigma_{i,j}(m_{i,j} - m_{i+1,j})^2}$$

where $\alpha$ is a constant whose value is to be adjusted experimentally, but whose value is very nearly equal to unity, $\Delta$ is the center-to-center spacing of pixels, $m_{i,j}$ denotes the measured signal value for the $(i,j)^{TH}$ pixel on the frame with one shutter open and $m'_{i,j}$ is the measured signal value for the $(i,j)^{TH}$ pixel on the frame with the other shutter open, and the sum over i,j includes all of the pixels in the region of interest for which the range is to be determined,
    and readout means affording an indication of the said displacement.

2. An optical distance measuring system according to claim 1 wherein once an image displacement $\delta$ is known, the range R to the said object is derived from the equation $$R = R_0 \pm \delta R_0^2/(FS),$$

where the plus or minus sign is chosen according to the sense of the image displacement $\delta$, the quantity $R_0$ denotes the range for which an object in the field-of-view is exactly focused by the optics onto the mosaic array, the quantity F denotes the distance from the optics to the mosaic array, and the quantity
    S denotes the center-to-center separation of the two shuttered regions behind the two shutters.

3. An optical distance measuring system according to claim 2 wherein the spacing between said shutter mechanisms and apertures therein can be varied as desired.

4. The method of making a distance measurement comprising the steps of,
    providing a detector array having a multiplicity of detector elements within a single plane directed along a line of sight for a given field of view having objects of interest whose range is to be determined relative to some reference distance,
    providing an optical system between said array and field of view having at least two shutter mechanisms spaced from each other laterally of said line of sight,
    causing said shutter mechanisms to be alternately actuated to expose said array to said field of view through laterally spaced apertures,
    determining the displacement of the images of said objects as shown from one exposure to another as an indication of distance to said objects, according to the equation $$\delta = \alpha \frac{\Delta}{4} \frac{\Sigma_{i,j}[(m_{i,j} - m'_{i+1,j})^2 - (m_{i+1,j} - m'_{i,j})^2]}{\Sigma_{i,j}(m_{i,j} - m_{i+1,j})^2}$$

where $\alpha$ is a constant whose value is to be adjusted experimentally, but whose value is very nearly equal to unity, $\Delta$ is the center-to-center spacing of pixels, $m_{i,j}$ denotes the measured signal value for the $(i,j)^{TH}$ pixel on the frame with one shutter open and $m'_{i,j}$ is the measured signal value for the $(i,j)^{TH}$ pixel on the frame with the other shutter open, and the sum over i,j includes all of the pixels in the region of interest for which the range is to be determined,
    and determining the range from the displacement according to the equation $$R = R_0 \pm \delta R_0^2/(FS),$$

where the plus or minus sign is chosen according to the sense of the image displacement $\delta$, the quantity R₀ denotes the range for which an object in the field-of-view is exactly focused by the optics onto the mosaic array, the quantity F denotes the distance from the optics to the mosaic array, and the quantity S denotes the center-to-center separation of the two shuttered regions behind the two shutters.

5. The method according to claim 4 wherein memory means is provided for storing information from said detector array from preceding exposures for comparison with succeeding exposures.

* * * * *